Patented Feb. 20, 1945

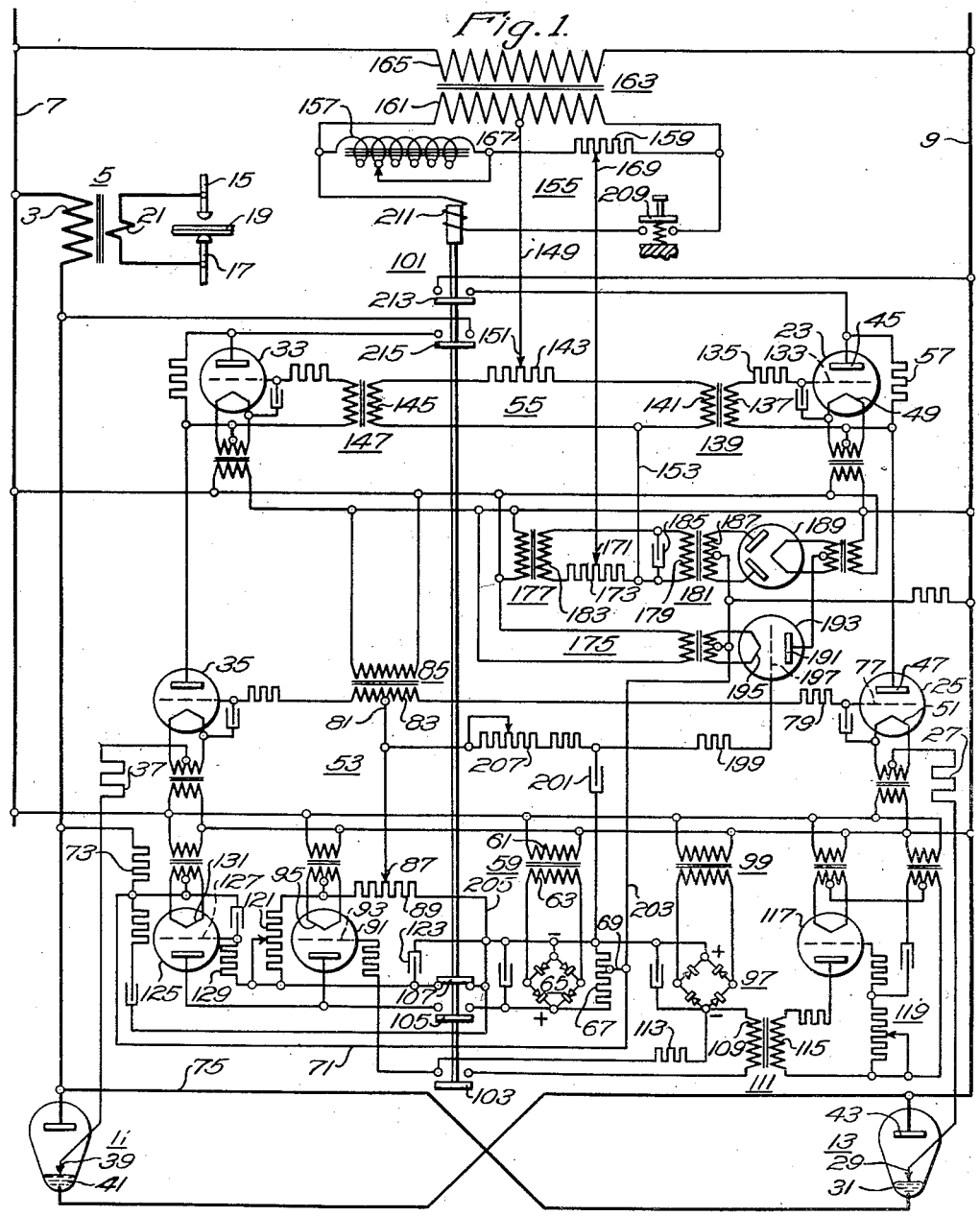

2,370,071

UNITED STATES PATENT OFFICE 2,370,071

ELECTRONIC CONTROL SYSTEM

Lloyd C. Poole, Wilkinsburg, Pa., assignor to Westinghouse Electric & Manufacturing Company, East Pittsburgh, Pa., a corporation of Pennsylvania Application May 14, 1942, Serial No. 442,938

13 Claims. (Cl. 250—27)

This invention relates to electronic control systems and has particular relation to systems for controlling the supply of power from a source of current to a load.

In resistance spot welding apparatus constructed in accordance with the teachings of the prior art, the supply of power from an alternating-current source to the welding transformer is controlled by a pair of ignitrons connected in anti-parallel between the source and the transformer. During a welding operation, the ignitrons are rendered conductive in alternate half periods of the source. A timing circuit is provided to limit the time during which current is supplied to the welding transformer to a predetermined number of half periods of the source for a single welding operation. To control the amount of energy supplied through the ignitrons in the predetermined number of half periods, the instant in a half period at which an ignitron is rendered conductive is controlled by an electric discharge valve, preferably a thyratron, connected in the firing circuit of each ignitron. A control potential derived from the source through a phase-shifting circuit is impressed in the control circuit of the thyratron which is rendered conductive when the control potential rises above a predetermined critical value. A potentiometer in the phase-shifting circuit may be adjusted so that the thyratron, and, therefore, the corresponding ignitron, is rendered conductive at any desired instant in a half period of the source. The particular instant to be selected depends, of course, upon the R. M. S. current required to produce the heat necessary to weld the particular material.

In welding heavy gauge metals, difficulty is encountered in that the heat required for welding within the desired time limit is so high that portions of the metal are burned. It has been discovered that burning of the heavy gauge metals may be materially reduced and in some cases eliminated, by supplying current of a low R. M. S. value at the beginning of the weld and gradually increasing it to reach a predetermined maximum value at a preselected time early in the welding period, and maintaining it at that maximum value for the remainder of the welding period. By supplying a higher than usual maximum current, the total time required for welding is not increased and may be reduced somewhat without burning the metal. Because of the speed with which the current must be increased, it is impossible to accomplish the desired result by manual adjustment of the potentiometer in the phase-shifting circuit.

Mechanical arrangements for varying the setting of the potentiometer which have been tried are also unsatisfactory. These arrangements include spring means for rapidly adjusting the potentiometer. However, the inertia of such arrangements does not permit sufficiently rapid action and the adjustment of the potentiometer is not the same in successive welding operations.

It is accordingly an object of my invention to provide a novel control system for welding apparatus, by the operation of which the R. M. S. value of the current supplied to the welding transformer in successive half periods of the source may be rapidly increased from a minimum to a maximum.

A more general object of my invention is to provide a novel system for controlling the conductivity of an electric discharge valve of the arc-like type.

Another object of my invention is to provide novel and inexpensive apparatus for supplying power from a source of alternating current to a load in which the energy supplied in successive half periods of the source may be rapidly varied in accordance with a predetermined plan.

A further object of my invention is to provide apparatus for supplying power from a source of alternating current to a load in which the energy supplied in successive half periods of the source may be rapidly increased.

A more specific object of my invention is to provide a control system for welding apparatus by the operation of which the R. M. S. value of the current supplied to the welding transformer in successive half periods of the source is rapidly increased from a minimum to a maximum and thereafter is maintained at the maximum value until the end of the welding period.

In accordance with my invention, a potential is impressed in the control circuit of the thyratron in the firing circuit of each ignitron which is comprised of a first alternating potential lagging in phase relative to the source, superimposed on a second alternating potential leading in phase relative to the first potential. Means are then provided to vary the magnitude of the second potential. The instant in a half period of the source at which the resultant potential first rises above the critical potential of the thyratron is then varied in accordance with variations in the magnitude of the second potential.

The first potential impressed on the control circuit of the thyratron may be derived from the source through the usual phase-shifting circuit. The phase-shifting circuit should be so arranged that the first potential lags in phase relative to the source to such an extent that when the second potential is at a minimum magnitude, the resultant potential first rises above the critical potential of the thyratron at an instant very late in each half period.

The second potential impressed in the control circuit of the thyratron may be derived in many ways. However, in the practice of my invention, I prefer to develop the second potential in an auxiliary circuit energized from the source. The auxiliary circuit includes an auxiliary transformer of a conventional audio frequency type having windings with a high resistance relative to the leakage reactance. A capacitor is connected across the primary of the auxiliary transformer to form a resonant circuit tuned to the frequency of the source. An impedance means, such as a resistor, is connected in series with the resonant circuit, and the potential developed across the resistor or a portion thereof is applied in the control circuit of the thyratron. A high vacuum valve is connected in circuit across the secondary of the auxiliary transformer, and the conductivity of the high vacuum valve is varied in accordance with a predetermined plan. Since the resistance of the secondary winding is high relative to the leakage reactance, the variation in the resistance load across the secondary winding is reflected chiefly as a variation in the resistance of the primary winding. Thus, the variation in the conductivity of the vacuum valve results in a variation in the resistance offered to the flow of current in the auxiliary circuit by the resonant circuit without changing the phase thereof substantially. It is apparent that the magnitude of the second potential developed across the resistor depends upon the magnitude of the current flowing therethrough and is varied with variations in the conductivity of the vacuum valve.

The parameters of the auxiliary circuit are such that the second potential is leading in phase relative to the first potential impressed on the control circuit of the thyratron. At the beginning of the weld, the magnitude of the second potential is at a minimum. The resultant potential then rises above the critical potential of the thyratron very late in the half period of the source. As the welding operation proceeds, the conductivity of the vacuum valve is increased rapidly. The magnitude of the second potential increases accordingly, and the resultant potential is thereby varied so that it first rises above the critical potential of the thyratron, gradually earlier in successive half periods of the source. At a preselected time during the weld, the conductivity of the vacuum valve reaches a predetermined maximum and remains constant until the end of the welding period. Therefore, after the conductivity of the vacuum valve reaches the predetermined maximum, the resultant potential first rises above the critical potential of the thyratron at the same relative instant in successive half periods of the source.

The novel features that I consider characteristic of my invention are set forth with particularity in the appended claims. The invention itself, however, both as to its organization and its method of operation, together with additional objects and advantages thereof, will best be understood from the following description of a preferred embodiment when read in connection with the accompanying drawing, in which:

Figure 1 is a diagrammatic view showing my invention as embodied in a welding apparatus; and Fig. 2 is a vector diagram illustrating the operation of the apparatus.

As shown in the drawing, current is supplied to the primary 3 of the welding transformer 5 from alternating-current source lines 7 and 9 through a pair of ignitrons 11 and 13 connected in anti-parallel. A pair of welding electrodes 15 and 17, arranged to engage the material 19 to be welded, are connected across the secondary 21 of the welding transformer 5. The firing circuit of one of the ignitrons 13 extends from one source line 9 through contactor 213 of a relay 101, a pair of thyratron tubes 23 and 25, a resistor 27, the igniter 29 and cathode 31 of the ignitron 13, through the primary 3 of the welding transformer 5, to the other source line 7. The firing circuit of the other ignitron 11 may be traced from the other source line 7 through the primary 3 of the welding transformer 5, contactor 215 of relay 101, a second pair of thyratrons 33 and 35, a resistor 37, the igniter 39 and cathode 41 of the ignitron 11 to the other source line 9. For purposes of explanation, the operation of the system is hereinafter discussed with reference to one of the ignitrons 13 and its firing circuit. It is to be understood that the firing circuit of the other ignitron 11 operates similarly and the ignitron 11 is rendered conductive in the opposite half periods.

When the thyratrons 23 and 25 are rendered conductive simultaneously, current flows through the igniter 29 to render the ignitron 13 conductive. It is to be noted that the anode 43 of the ignitron is positive with respect to the cathode 31 when the anodes 45 and 47 of the thyratrons 23 and 25 are positive with respect to their corresponding cathodes 49 and 51. One of the thyratrons 25 is rendered conductive at the beginning of each half period in which welding current is to flow, by a timing circuit 53. The other thyratron 23 is rendered conductive at a particular instant in each half period under the control of a heat control circuit 55. During the first part of a half period before the second thyratron 23 becomes conductive, the first thyratron 25 is maintained conductive by a small current flowing through a large resistor 57 which shunts the second thyratron 23. This current is, of course, too small to render the ignitron 13 conductive.

The timing circuit 53 for the thyratron 25 is supplied with power through a transformer 59 whose primary 61 is connected between source lines 7 and 9. The secondary 63 of the transformer 59 supplies power to a rectifier 65 whose output is impressed across a voltage divider 67. An intermediate tap 69 on the voltage divider 67 is connected through conductor 71, a resistor 73 a conductor 75 to the cathode 31 of the ignitron 13, the igniter 29 of the ignitron 13, a resistor 27 to the cathode 51 of the thyratron 25. The grid 77 of the thyratron 25 is connected through a grid resistor 79 and an intermediate tap 81 on the secondary 83 of the compensating transformer 85 to an intermediate tap 87 on a second voltage divider 89. The second voltage divider 89 is connected across the first voltage divider 67 through a thyratron 91 which may be called a start tube. Since the start tube 91 is originally non-conductive, the intermediate tap 69 of the first voltage divider 67 is positive with respect to the intermediate tap 87 of the second voltage divider 89. Consequently, the cathode 51 of the thyratron 25 on the control circuit of the ignitron 13 is positive with respect to the grid 77, and the thyratron 25 is therefore maintained non-conductive.

The start tube 91 is originally maintained non-conductive by a biasing potential impressed between its grid 93 and the cathode 95 by a rectifier 97 energized from the source through transformer 99. A current relay 101 is energized by means which is described hereinafter at the beginning of the welding period. A pair of contactors 103 and 105 of the relay 101 are then closed in the timing circuit and a third contactor 107 is opened. One of these contactors 103 connects the secondary 109 of a peaking transformer 111 across a resistor 113 in series with the rectifier 97. The primary 115 of the peaking transformer 111 is in series with another thyratron 117. The control circuit of thyratron 117 includes a phase-shifting circuit 119 energized from the source lines 7 and 9. The phase-shifting circuit 119 is adjusted in accordance with the power factor of the load to render the thyratron 117 conductive at the beginning of each half period of the source current. When the thyratron 117 becomes conductive, the peaking transformer 111 impresses an impulse across the resistor 113 which is sufficient to render the start tube 91 conductive.

When the start tube 91 becomes conductive, current flows from the positive terminal of divider 67 through contactor 105, start tube 91 and the second voltage divider 89 to the negative terminal. It is then evident that the intermediate tap 87 of the second voltage divider 89 becomes positive with respect to the intermediate tap 69 of the first voltage divider 67. The grid 77 of the thyratron 25 in the ignitron control circuit thus becomes positive to render the thyratron 25 conductive.

Current flowing through the start tube 91 also flows through a resistor 121 and a capacitor 123 connected in parallel with the second voltage divider 89. This capacitor 123 is connected in the control circuit of another thyratron 125, known as the stop tube, which is connected between the positive terminal of divider 67 and the intermediate tap 69 of the divider through conductor 71. The control circuit of the stop tube 125 extends from the grid 127 through grid resistor 129, the capacitor 123, the upper portion of the voltage divider 67, the intermediate tap 69 and conductor 71 to the cathode 131. The voltage divider 67 normally maintains the grid 127 negative with respect to the cathode 131. However, after the start tube 91 has been conductive for a predetermined time interval, the capacitor 123 is charged sufficiently to counteract the bias of the upper portion of the voltage divider 67 and render the stop tube 125 conductive. The circuit from the first voltage divider 67 through the stop tube 125 shunts the start tube 91 so that intermediate tap 69 connected to the cathode 131 of the stop tube 125 assumes substantially the same potential as the cathode 95 of the start tube 91. As a result, the intermediate tap 87 of the second voltage divider 89 changes from positive to negative with respect to the intermediate tap 69 of the first voltage divider 67. Thus, the original bias is replaced on the thyratron 25 in the control circuit of the ignitron 13 to maintain the thyratron 25 non-conductive. Relay 101 must be deenergized to open contactor 105 to cause the start and stop tubes to cease conducting and to close contactor 107 to complete a discharge circuit for capacitor 123 before thyratron 25 may be rendered conductive again.

Control of the second thyratron 23 in the firing circuit of the ignitron 13 is accomplished by the heat control circuit 55. The grid 133 of the thyratron 23 is connected to the cathode 49 through a grid resistor 135 and the secondary 137 of a transformer 139. The primary 141 of the transformer 139 is connected in a series circuit including a balance potentiometer 143 and the primary 145 of a similar transformer 147 associated with the corresponding thyratron 33 in the firing circuit of the other ignitron 11. Potential is supplied to the transformer circuit through a line 149 connected to the adjustable tap 151 on the potentiometer 143 and a second line 153 connected between the primaries of the transformers 139 and 147.

A phase-shifting circuit 155 is provided which comprises an inductance 157 and a resistor 159 in series across the secondary 161 of a supply transformer 163 the primary 165 of which is energized from the source lines 7 and 9. The center tap 167 of the secondary 161 of the supply transformer 163 is connected to the adjustable tap 151 on the potentiometer 143 through conductor 149. An adjustable tap 169 is also provided on the resistor 159 of the phase-shifting circuit. It is then apparent that an alternating potential exists between the adjustable tap 151 of the potentiometer 143 and the adjustable tap 169 of the resistor 159 which is lagging in phase relative to the source potential.

The adjustable tap 169 on the resistor 159 of the phase-shifting circuit is connected to an adjustable tap 171 on a resistor 173 in an auxiliary circuit 175. Energy is supplied to the auxiliary circuit through another transformer 177 energized from the source lines 7 and 9. The primary 179 of an auxiliary transformer 181 is then connected in series with the resistor 173 and the secondary 183 of the transformer 177. A capacitor 185 is connected in parallel with the primary 179 of the auxiliary transformer 181 to form a resonant circuit therewith which is substantially tuned to the frequency of the source. Thus, the magnitude of the current flowing through the resistor 173 depends upon the resistance offered by the resonant circuit.

The end terminals of the secondary 187 of the auxiliary transformer 181 are connected to the anodes of a full-wave rectifier 189. The cathode of the rectifier 189 is connected to the anode 191 of a high vacuum electric discharge valve 193 the cathode 195 of which is then connected to a center tap on the secondary 187. The secondary winding 187 of the auxiliary transformer 181 has a high resistance relative to the leakage reactance thereof. Therefore as the conductivity of the high vacuum valve 193 is varied, the resistance of the primary 179 of the auxiliary transformer 181 is changed while the resonant circuit remains substantially tuned. This changes the resistance offered by the resonant circuit, so that the magnitude of the current flowing through the resistor 173, and, therefore, the magnitude of the potential developed across the resistor 173 is changed.

The control circuit of the high vacuum valve 193 may be traced from its grid 197 through a grid resistor 199, a capacitor 201, a portion of the voltage divider 67 to the intermediate tap 69 thereof, and thence through conductor 203 to the cathode 195 of the vacuum valve 193. The capacitor 201 originally is uncharged, and the biasing potential provided by the voltage divider 67 maintains the vacuum valve 193 non-conductive. However, the capacitor 201 is also connected in a circuit extending through conductor 205, a portion of the second voltage divider 89, the intermediate tap 87 and an adjustable resistor 207 back to the capacitor. When the start tube 91 becomes conductive, the second voltage divider 89 is energized, and current flows through the capacitor 201 to charge it at a rate determined by the setting of the adjustable resistor 207. The capacitor 201 is charged with a polarity opposing the biasing potential supplied from the first voltage divider 67 in the control circuit of the high vacuum valve 193. Thus, while capacitor 201 is being charged, the conductivity of the vacuum valve 193 is gradually increased. After the capacitor 201 becomes fully charged, the conductivity of the vacuum valve 193 remains at the same level until the stop tube 125 becomes conductive. The capacitor 201 is discharged through the adjustable resistor 207 after the start tube 91 ceases to conduct current.

To initiate a welding operation, a push-button switch 209 is closed, energizing the coil 211 of the relay 101 connected in series therewith across the secondary 161 of the supply transformer 163. Energization of the coil 211 of the relay 101 effects closure of the contactors 103, 105, 213 and 215 and operation of the timing circuit 53 is initiated. The start tube 91 of the timing circuit becomes conductive, and, as a result, the thyratrons 25 and 35 in the firing circuits of the ignitrons 13 and 11 respectively become conductive in alternate half periods of the source.

The high vacuum valve 193 is non-conductive at the beginning of the welding operation. Therefore, the potential of the resistor 173 in the auxiliary circuit 175 has a low magnitude. The phase-shifting circuit 155 is so adjusted that the potential produced thereby, plus the potential developed across the resistor 173 in the auxiliary circuit, gives a resultant potential which first rises above the critical firing potential of the thyratrons 23 and 33 in the firing circuits of the ignitrons 13 and 11, at an instant late in each half period. As the capacitor 201 in the control circuit of the vacuum valve 193 is charged at a fixed rate, the magnitude of the potential supplied from the resistor 173 of the auxiliary circuit 175 increases rapidly at a fixed rate. Therefore, the resultant potential rises above the critical potential of the thyratrons 23 and 33 gradually earlier in successive half periods. When the capacitor 201 becomes fully charged, the magnitude of the potential supplied by the resistor 173 remains constant. Then the resultant potential first rises above the critical potential of the thyratrons 23 and 33 at the same relative instant in successive half periods.

After the expiration of a predetermined number of half periods of the source, the stop valve 125 of the timing circuit becomes conductive. The thyratrons 25 and 35 in the firing circuits of the ignitrons are thereafter prevented from becoming conductive until a new welding operation is initiated. To initiate another welding operation, the push button 209 may be released and again depressed. When the push button 209 is released, the relay 101 is deenergized, and its contactor 107 closes the discharging circuit of the capacitor 201.

In the vector diagram shown in Fig. 2, the potential across the secondary 161 of the supply transformer 163 is shown as a vertical vector 161a. The vectors representing the potentials across the resistor 159 and inductance 157 connected across the secondary 161 are shown at 159a and 157a. The potential at the adjustable tap 169 on the resistor 159 in the phase-shifting circuit is shown at 169a on vector 159a. Since the center tap 167 of the secondary 161 is connected to the adjustable tap 151 of the potentiometer 143, it is apparent that the potential existing between the adjustable tap 151 of the potentiometer 143 and the adjustable tap 169 of the resistor 159 lags considerably behind the source potential, as shown by the dotted vector 219. The potential developed across the portion of resistor 173 between the conductor 153 and tap 171 is added to the potential produced by the phase-shifting circuit. This resistor potential is substantially in phase with the source potential 161a and is illustrated by the vector 173a. The resultant potential thus applied in the control circuit of the thyratron is shown as the vector 221 extending from the center 167a of vector 161a to the end of the resistor potential vector 173a. Since the resistor potential is very low in magnitude at the beginning of the welding operation, the resultant potential vector 221 lags several degrees behind the source vector 161a. As the resistor potential magnitude is increased, the size of the vector 173a is increased, so that the degree of lag of the vector 221 representing the resultant potential is decreased. When the resistor potential reaches its maximum magnitude, as illustrated by the dotted vector 173b, the resultant potential will have reached a phase position indicated by the dotted vector 221b.

It is to be noted that the magnitude of the vector 221 representing the resultant potential is varied as the resistor potential is increased. For this reason, care must be taken to proportion the individual potentials in such a manner that the magnitude of the resultant potential never decreases below that necessary to render the thyratrons 23 and 33 conductive. The minimum potential across resistor 173 must be as small as possible. The larger the vector 173a is, the further point 169a must be set to the left on vector 159a to permit the vector 221 to reach the desired maximum phase displacement. Readjustment of point 169a to the left results in reducing the magnitude of the vector 221 at its minimum point which occurs when the vector 221 is at right angles to vector 161a. It is for this reason that the capacitor 185 and primary 179 are tuned to resonance to reduce the potential developed across resistor 173 to as small a value as possible at the beginning of the welding operation.

In a welding apparatus of the type described which was actually built and operated, a Westinghouse ignitron spot welder system was employed. To this standard equipment was added the auxiliary circuits 175, in which the transformer 177 was a 44 v. a., 220-volt transformer, the auxiliary transformer 181 was a T-11M74 Thordarson transformer, the resistor 173 was a 2,000-ohm resistor, and the capacitor 185 had a 2 microfarad capacity. The rectifier 189 was an RCA 83 tube, and the high vacuum valve 193 was an RJ-563 amplifier tube.

Although I have shown and described a specific embodiment of my invention, I am fully aware that many modifications thereof are possible. My invention is, therefore, not to be restricted except by the prior art and the spirit of the invention.

I claim as my invention:

1. For use in controlling the supply of power from a source of alternating current to a load, the combination comprising an electric discharge valve of the arc-like type having a pair of principal electrodes interposed between said source and load and a control electrode, said valve means being connected to be rendered conductive in positive half periods of the source upon the application between said control electrode and one of said principal electrodes of a potential greater than a predetermined critical value, a control circuit extending between said control electrode and said one principal electrode, means for applying in said control circuit a first alternating potential lagging in phase relative to said source, means for applying in said control circuit a second alternating potential leading in phase relative to said first potential, and means for varying the magnitude of said second potential between a minimum value at which the resultant potential applied in said control circuit first rises above said critical value late in a positive half period and a maximum value at which the resultant potential applied in said control circuit first rises above said critical value early in a positive half period.

2. For use in controlling the supply of power from a source of alternating current to a load, the combination comprising an electric discharge valve of the arc-like type having a pair of principal electrodes interposed between said source and load and a control electrode, said valve means being connected to be rendered conductive in positive half periods of the source upon the application between said control electrode and one of said principal electrodes of a potential greater than a predetermined critical value, a control circuit extending between said control electrode and said one principal electrode, means for applying in said control circuit a first alternating potential lagging in phase relative to said source, means for applying in said control circuit a second alternating potential leading in phase relative to said first potential, and means for varying the magnitude of said second potential in accordance with a predetermined plan whereby to vary the instant at which the resultant potential applied in said control circuit first rises above said critical value in said positive half periods.

3. For use in controlling the supply of power from a source of alternating current to a load, the combination comprising valve means interposed between said source and load, a control circuit for said valve means, said valve means being connected to be rendered conductive in positive half periods of the source upon the application in said control circuit of a potential greater than a predetermined critical value, means for applying in said control circuit a first alternating potential lagging in phase relative to said source, means for applying in said control circuit a second alternating potential leading in phase relative to said first potential and having such a magnitude that the resultant potential applied in said control circuit first rises above said critical value late in each positive half period, and means for gradually increasing the magnitude of said second potential at a preselected rate to a predetermined maximum, whereby the resultant potential first rises above said critical value gradually earlier in successive positive half periods until said maximum magnitude is reached and thereafter rises to the same critical value at the same relative instant in successive half periods.

4. For use in controlling the supply of power from a source of alternating current to a load, the combination comprising valve means interposed between said source and load, a control circuit for said valve means, said valve means being connected to be rendered conductive in positive half periods of the source upon the application in said control circuit of a potential greater than a predetermined critical value, means for applying in said control circuit a first alternating potential lagging in phase relative to said source, means for applying in said control circuit a second alternating potential leading in phase relative to said first potential comprising an auxiliary circuit including series connected first and second impedance means energized from said source and means for impressing the potential developed across said first impedance means by the current flow therethrough in said control circuit, and means coupled to said auxiliary circuit for varying the impedance of said second impedance means to thereby vary the magnitude of the potential developed across said first impedance means, including a high-vacuum valve and means for varying the conductivity thereof.

5. For use in controlling the supply of power from a source of alternating current to a load, the combination comprising valve means interposed between said source and load, a control circuit for said valve means, said valve means being connected to be rendered conductive in positive half periods of the source upon the application in said control circuit of a potential greater than a predetermined critical value, means for applying in said control circuit a first alternating potential lagging in phase relative to said source, an auxiliary circuit energized from said source and including a transformer having primary and secondary windings, a capacitor connected in parallel with said primary winding to form a resonant circuit substantially tuned to the frequency of said source and impedance means connected in series with said resonant circuit, means for applying in said control circuit the potential developed across said impedance means by the current flowing therethrough, the parameters of said auxiliary circuit being such that said developed potential is leading in phase relative to said first potential, a high vacuum electric discharge valve connected across said secondary winding, and means for varying the conductivity of said high vacuum valve to vary the resistance of said resonant circuit.

6. In combination, means adapted to form a source of periodically pulsating potential, a transformer having primary and secondary windings, a work circuit including said primary winding in series with said source, a capacitor connected in parallel with said primary winding to form a resonant circuit substantially tuned to the frequency of said source, a resistance load connected across said secondary winding, and means for gradually varying the resistance of said load whereby the magnitude of the current flowing from said source is varied.

7. In combination, means adapted to form a source of periodically pulsating potential, a transformer having primary and secondary windings with high resistance relative to the leakage reactance, a work circuit including said primary winding in series with said source, a capacitor connected in parallel with said primary winding to form a resonant circuit substantially tuned to the frequency of said source, a high vacuum electric discharge valve connected in circuit across said secondary winding, and means for varying the conductivity of said valve whereby the resistance of said resonant circuit is varied.

8. In combination, means adapted to form a source of periodically pulsating potential, a transformer having primary and secondary windings, a capacitor connected in parallel with said primary winding to form a resonant circuit substantially tuned to the frequency of said source, impedance means connected in series with said resonant circuit and said source, means connected across said impedance means to utilize the potential developed by the flow of current therethrough, a load connected across said secondary winding, and means for gradually varying the resistance of said load whereby the magnitude of the current flowing through said impedance means is varied.

9. In combination, means adapted to form a source of periodically pulsating potential, a transformer having primary and secondary windings with high resistance relative to the leakage reactance, a capacitor connected in parallel with said primary winding to form a resonant circuit substantially tuned to the frequency of said source, impedance means connected in series with said resonant circuit and said source, means connected across said impedance means to utilize the potential developed by the flow of current therethrough, a high vacuum electric discharge valve connected across said secondary winding, and means for varying the conductivity of said valve whereby the resistance of said resonant circuit is varied.

10. For use in controlling the supply of power from a source of alternating current to a load, the combination comprising valve means interposed between said source and load, a control circuit for said valve means, said valve means being connected to be rendered conductive in positive half periods of the source upon the application in said control circuit of a potential greater than a predetermined critical value, means for applying in said control circuit a first alternating potential lagging in phase relative to said source, an auxiliary circuit energized from said source and including a transformer having primary and secondary windings, a capacitor connected in parallel with said primary winding to form a resonant circuit substantially tuned to the frequency of said source and impedance means connected in series with said resonant circuit, means for applying in said control circuit the potential developed across said impedance means by the current flowing therethrough, the parameters of said auxiliary circuit being such that said developed potential is leading in phase relative to said first potential, a high vacuum electric discharge valve having a plurality of principal electrodes connected across said secondary winding and a control electrode, and means for varying the conductivity of said high vacuum valve to vary the resistance of said resonant circuit comprising a normally discharged capacitor and a source of auxiliary potential connected between said control electrode and one of said principal electrodes and means for charging said capacitor at a predetermined rate.

11. For use in controlling the supply of power from a source of alternating current to a load, the combination comprising main valve means interposed between said source and load, a control circuit for said valve means, said valve means being connected to be rendered conductive in positive half periods of the source upon the application in said control circuit of a potential greater than a predetermined critical value, means for applying in said control circuit a first alternating potential lagging in phase relative to said source, an auxiliary circuit energized from said source and including a transformer having primary and secondary windings, a capacitor connected in parallel with said primary winding to form a resonant circuit substantially tuned to the frequency of said source and impedance means connected in series with said resonant circuit, means for applying in said control circuit the potential developed across said impedance means by the current flowing therethrough, the parameters of said auxiliary circuit being such that said developed potential is leading in phase relative to said first potential, a high vacuum electric discharge valve having a plurality of principal electrodes connected across said secondary winding and a control electrode, a normally discharged capacitor and a source of auxiliary potential connected between said control electrode and one of said principal electrodes whereby the conductivity of said high vacuum valve is such as to result in a resistance of the resonant circuit which causes the resultant of said first potential and said developed potential to rise above said critical value late in a positive half-period, switch means for preventing said main valve means from being rendered conductive until operation thereof, and means responsive to operation of said switch means for initiating charging of said capacitor at a predetermined rate whereby said resultant potential first rises above said critical value gradually earlier in successive positive half-periods.

12. For use in controlling the supply of power from a source of alternating current to a load, the combination comprising an electric discharge valve of the arc-like type having a pair of principal electrodes interposed between said source and load and a control electrode, said valve means being connected to be rendered conductive in positive half-periods of the source upon the application between said control electrode and one of said principal electrodes of a potential greater than a predetermined critical value, a control circuit extending between said control electrode and said one principal electrode, means for applying in said control circuit a first alternating potential of the same frequency as said source, means for applying in said control circuit a second alternating potential of the same frequency as said first potential but differing in phase relative thereto, and means for varying the magnitude of said second potential to vary the instant at which the resultant potential applied in said control circuit first rises above said critical value in said positive half periods.

13. Apparatus according to claim 12 in which the means for applying the second alternating potential in said control circuit comprises an auxiliary circuit energized from said source and including series connected first and second impedance means, and the means for varying the magnitude of the second potential comprises means inductively coupled to said second impedance means for varying the impedance thereof to thereby vary the magnitude of the potential developed across said first impedance means by the current flowing therethrough, said inductivity coupled means including a circuit having a high vacuum valve therein and means for varying the conductivity of said valve whereby to vary the impedance of said second impedance means.

LLOYD C. POOLE.